United States Patent
Yang

(10) Patent No.: US 10,728,994 B1
(45) Date of Patent: Jul. 28, 2020

(54) MULTI-MODE SERIES LIGHT CONTROLLING SYSTEM

(71) Applicant: JETMAX LIGHTING INDUSTRIAL CO., LIMITED, Dongguan, Guangdong (CN)

(72) Inventor: Ping Yang, Guangdong (CN)

(73) Assignee: JETMAX LIGHTING INDUSTRIAL CO., LIMITED, Dongguan (CN)

( * ) Notice: Subject to any disclaimer, the term of this patent is extended or adjusted under 35 U.S.C. 154(b) by 0 days.

(21) Appl. No.: 16/691,660

(22) Filed: Nov. 22, 2019

(51) Int. Cl.
*H05B 45/37* (2020.01)
*H05B 47/19* (2020.01)
*F21V 23/06* (2006.01)
*H05B 45/44* (2020.01)
*F21Y 115/10* (2016.01)

(52) U.S. Cl.
CPC ............ *H05B 47/19* (2020.01); *F21V 23/06* (2013.01); *H05B 45/37* (2020.01); *H05B 45/44* (2020.01); *F21Y 2115/10* (2016.08)

(58) Field of Classification Search
CPC ........ H05B 45/00; H05B 45/10; H05B 45/37; H05B 45/44; H05B 47/10; H05B 47/19; F21V 23/06; F21Y 2115/10
See application file for complete search history.

(56) References Cited

U.S. PATENT DOCUMENTS

| 6,285,140 B1 | 9/2001 | Ruxton |
| 8,203,275 B2 | 6/2012 | Ruxton |
| 8,680,773 B2 | 3/2014 | Hering et al. |
| 10,314,127 B2 | 6/2019 | Zheng |
| 10,455,673 B1 | 10/2019 | Yang |
| 2006/0198143 A1 | 9/2006 | Cheung |
| 2015/0300585 A1* | 10/2015 | Wu ........................ F21V 21/112 362/222 |

FOREIGN PATENT DOCUMENTS

| CN | 1804455 A | 7/2006 |
| CN | 100472118 C | 3/2009 |
| CN | 205746248 U | 11/2016 |

* cited by examiner

*Primary Examiner* — Jimmy T Vu

(74) *Attorney, Agent, or Firm* — Pai Patent & Trademark Law Firm; Chao-Chang David Pai

(57) ABSTRACT

The present invention relates to a multi-mode series light controlling system, including a main control device that includes a front plug, a control unit, a mode switching key, a tail plug, and a connection module. The tail plug is electrically connected to the front plug through the control unit. The connection module is able to connect with multiple series lights simultaneously. The front plug is used to connect an AC power source. The control unit generates a lighting control signal according to the mode switching key and provides it to the connection module through the tail plug. The main control device provides functions to control multiple series light to switch between on, off, and different lighting patterns. Therefore, the controlling system is a progressive replacement for multiple control switches for multiple series light, achieving the purpose of managing series lights with one device.

9 Claims, 8 Drawing Sheets

MULTI-MODE SERIES LIGHT CONTROLLING SYSTEM

BACKGROUND OF THE INVENTION

1. Field of the Invention

The present invention relates to a controlling system, and particularly a multi-mode series light controlling system.

2. Description of the Related Art

Series light is popularly used to do lighting decorations both indoors and outdoors. The series light includes a control switch to control the on, off or different lighting modes of the series light. However, a user usually sets up multiple series lights for decoration extending in a wide area. When the user wants to turn on/off the series lights, or switch the lighting mode of the series lights altogether, the user needs to operate each control switch of each series light at a time. This common situation leads to waste of time and inconvenience for the users.

SUMMARY OF THE INVENTION

The present invention provides a multi-mode series light controlling system. The controlling system includes a main control device, including a front plug, a tail plug, a control unit, a mode switching key and a connection module. The control unit is electrically connected to the mode switching key. The tail plug is electrically connected to the front plug through the control unit. The connection module is electrically connected to the tail plug and includes multiple output sockets. The control unit generates a mode switching signal when the mode switching key is triggered, generates a lighting control signal accordingly, and sends the lighting control signal to the output sockets of the connection module.

The connection module is used to connect multiple series lights. The front plug is used to connect with an AC power source, and the control unit supplies a converted power to the tail plug to the connection module along with or according to the mode switching signal. The main control device controls the series lights connected to the connection module to present an "on" state, an "off" state, or different lighting modes.

The control unit stores data of multiple different lighting modes. When the mode switching key is triggered and the control unit detects the mode switching signal, the control unit reads the data of the next lighting modes and generates the lighting control signal for the assigned lighting mode. As a result, the series lights connected to the connection module are controlled altogether, and present the same lighting mode or pattern since they share the same lighting control signal from the connection module. The multi-mode series light controlling system provides a centralized controlling system for multiple series lights, so that the user needs not operate each control device or switch of the series lights every time a mode change is required. The multi-mode series light controlling system also provides an easy and convenient way to put up more series lights to the setting.

DETAILED DESCRIPTION OF THE INVENTION

Figure 1:
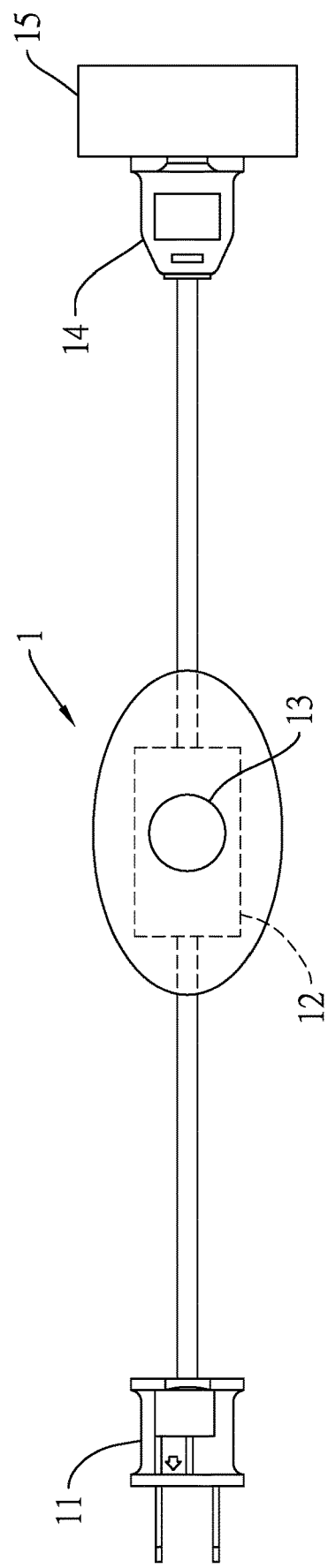
FIG. 1 is a schematic plan view of the multi-mode series light controlling system of the present invention.
Figure 2:
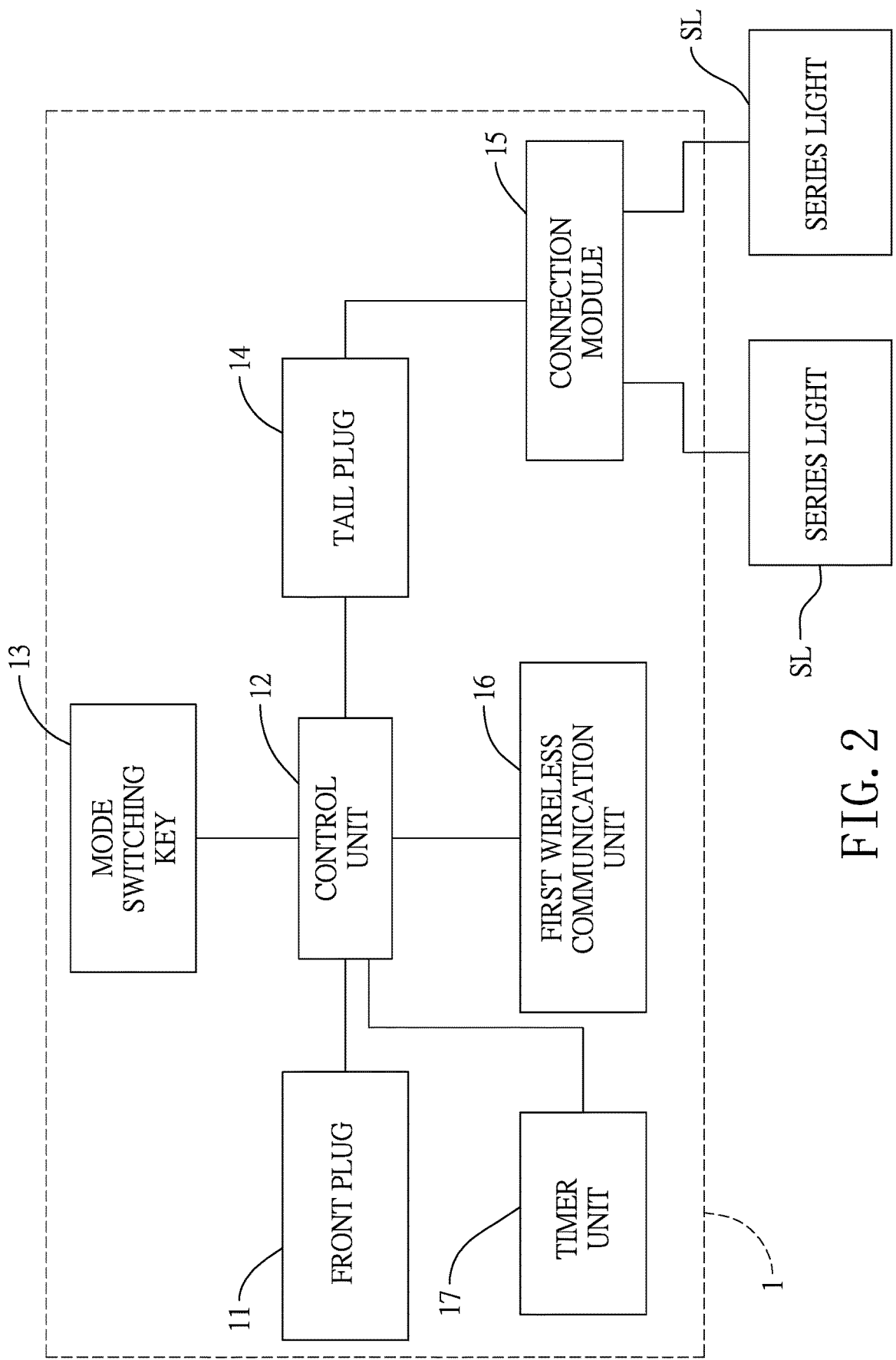
FIG. 2 is a block diagram of the multi-mode series light controlling system of the present invention.

With reference to FIG. 1, the present invention provides a multi-mode series light controlling system. With reference to FIG. 1 and FIG. 2, the controlling system includes a main control device 1, having a front plug 11, a control unit 12, a mode switching key 13, a tail plug 14, and a connection module 15. The mode switching key 13 is electrically connected to the control unit 12. The tail plug 14 is electrically connected to the front plug 11 through the control unit 12 by a power cord 120. The connection module 15 is electrically connected to the tail plug 14, and includes multiple output sockets. The control unit 12 generates a mode switching signal when the mode switching key 13 is triggered, generates a lighting control signal accordingly, and sends the lighting control signal to the output sockets of the connection module 15 through the tail plug 14.

With reference to FIG. 2, in a first embodiment of the present invention, the main control device 1 further includes a first wireless communication unit 16, which is electrically connected to the control unit 12. The first wireless communication unit 16 is a Bluetooth module, a Wi-fi module, or an infrared communication module. The first wireless communication unit 16 communicates with a wireless communication device. When the control unit 12 receives a wireless control signal from the wireless communication device through the first wireless communication unit 16, the control unit 12 generates the mode switching signal according to the wireless control signal. The wireless communication device may be a smart phone, a mobile device, or a remote controller, etc.

Figure 3:
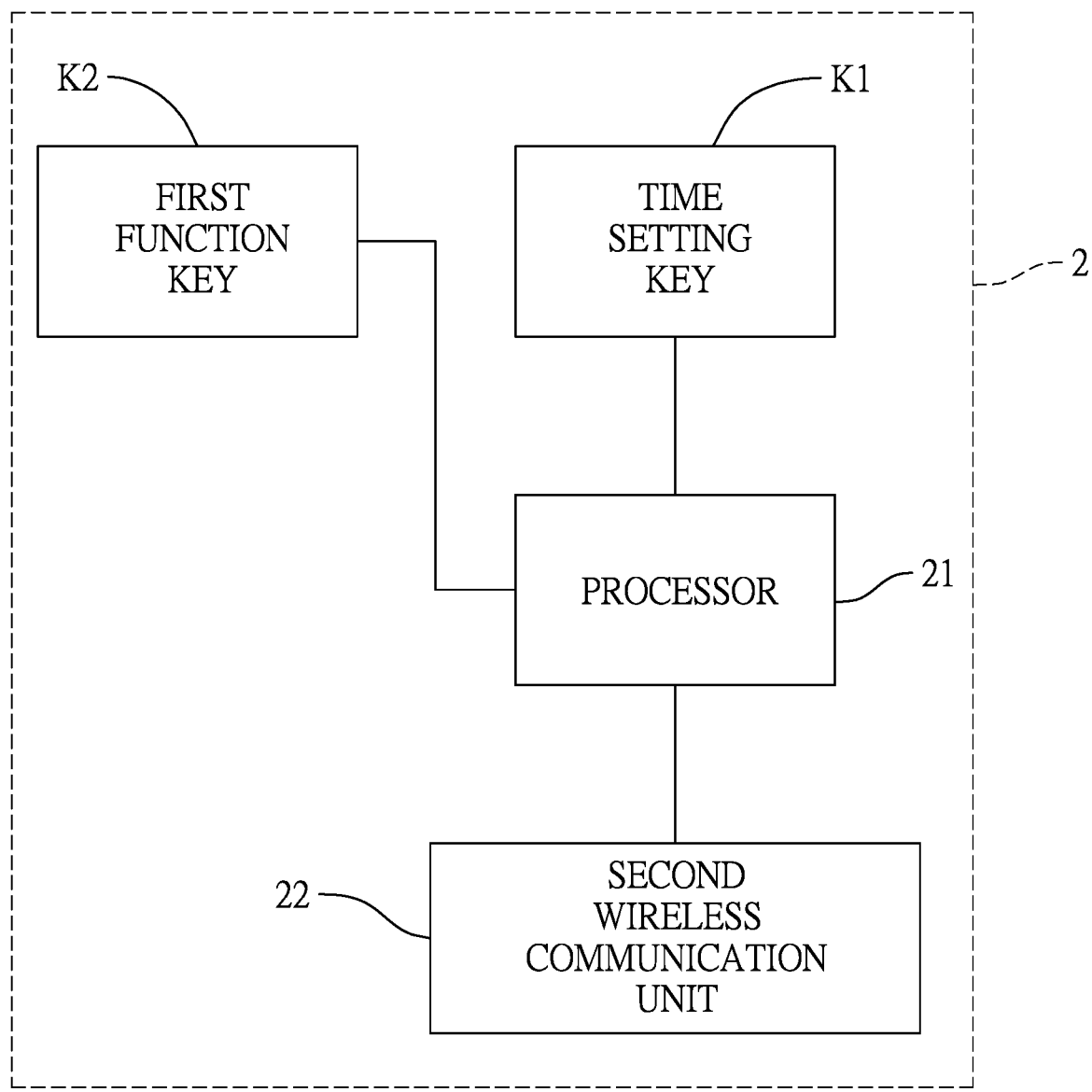
FIG. 3 is a block diagram of a remote controller of the multi-mode series light controlling system of the present invention.
Figure 4:
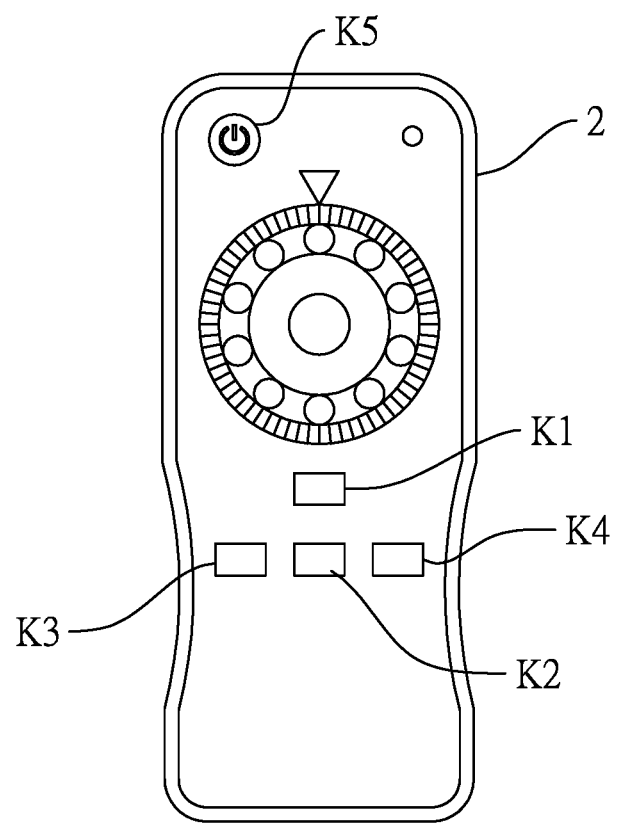
FIG. 4 is a schematic plan view of a remote controller of the multi-mode series light controlling system of the present invention.

With reference to FIG. 3 and FIG. 4, in a second embodiment of the present invention, the controlling system further includes the wireless communication device, and the wireless communication device may be a remote controller 2, which includes a processor 21, a time setting key K1, a first function key K2, and a second wireless communication unit 22. The time setting key K1, the first function key K2, and the second wireless communication unit 22 are electrically connected to the processor 21. The main control device 1 further includes a timer unit 17 which is electrically connected to the control unit 12. The timer unit 17 is wirelessly connected to the remote controller 2 through the first wireless communication unit 16. The timer unit 17 stores a timer data when receiving a timer setting signal from the remote controller 2, and starts a timer function according to the timer data.

When the first function key K2 is triggered, the processor 21 of the remote controller 2 generates the wireless control signal, and sends the wireless control signal to the first wireless communication unit 16 through the second wireless communication unit 22.

Figure 5A:
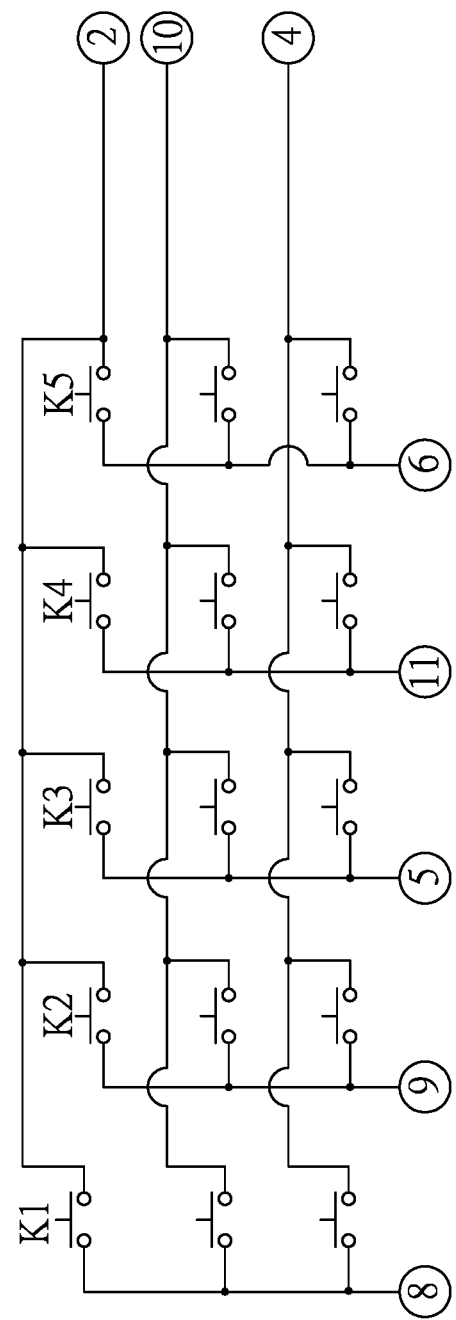
FIG. 5A and FIG. 5B are circuit diagrams of a remote controller of the multi-mode series light controlling system of the present invention.
Figure 5B:
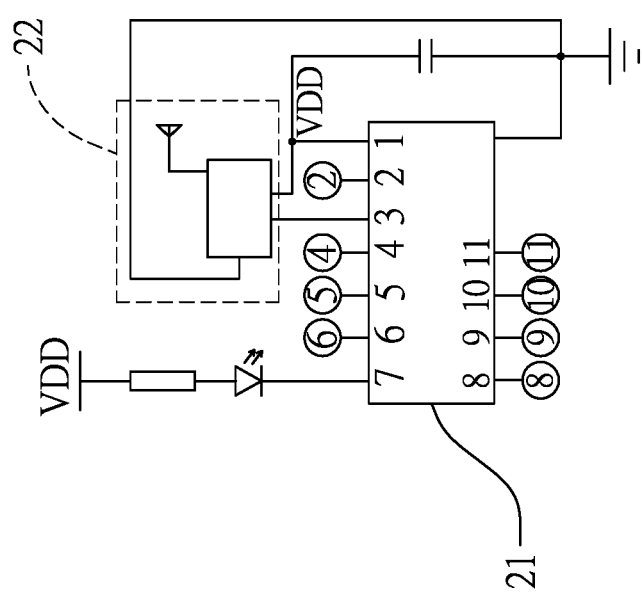

Preferably, the remote controller 2 may further include a second function key K3, a third function key K4, a fourth function key K5, and a fifth function key K6. The connections of the function keys and the processor 21 are as shown in FIG. 5A and FIG. 5B. When the processor 21 detects the conduction state of each function key from a different input pin, the processor 21 outputs the corresponding control signal to the second wireless communication unit 22, and sends the wireless control signal to the main control device 1.

With the remote controller 2, a user can control the series lights SL from a distance, such as setting a timer to pre-schedule the series lights SL, or switching the lighting mode immediately, improving the adaptability and convenience of the controlling system.

Figure 6:
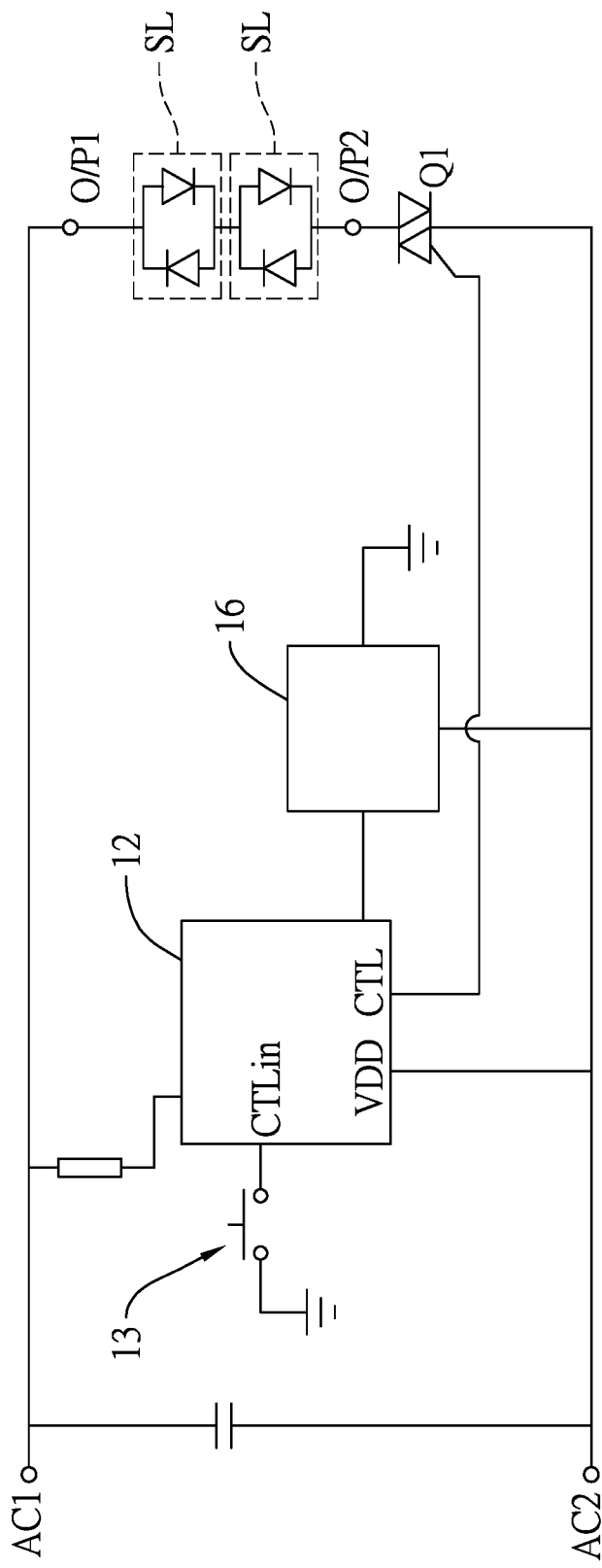
FIG. 6 is a circuit diagram of a third embodiment of the multi-mode series light controlling system of the present invention.

With reference to FIG. 6, in a third embodiment of the present invention, the main control device 1 includes a first switch unit Q1, a first AC input end AC1, a second AC input end AC2, a first output end O/P1 and a second output end O/P2. The first AC input end AC1 and the second AC input end AC2 are electrically connected to two pins of the front plug 11 through the power cord. The first output end O/P1 is electrically connected to the first AC input end AC1, and the second output end O/P2 is electrically connected to the second AC input end AC2 through the first switch unit Q1. The first switch unit Q1 has a control end. The control unit 12 includes a power input end VDD, a control input end CTLin and a control output end CTL. The power input end VDD is electrically connected to the first AC input end AC1, and the control output end CTL is electrically connected to the control end of the first switch unit Q1. The control input end CTLin is electrically connected to a ground through the mode switching key 13.

The first output end O/P1 and the second output end O/P2 are electrically connected to two connecting ends of the connection module 15. Preferably, the first switch unit Q1 is a triode for alternating current (TRIAC), and the control end of the first switch unit is the gate of the TRIAC.

As illustrated in FIG. 6, the series lights SL are connected in series between the two connecting ends of the connection module 15 when plugged into the output sockets. Namely, the series lights SL are connected in series between the first output end O/P1 and the second output end O/P2. Therefore, by controlling the conducting state of the first switch unit Q1 with the switching signal is outputted to the control end, the control unit 12 controls the AC current passing through the series lights SL according to the lighting mode data.

In a fourth embodiment of the present invention, the main control device 1 may further include a converter 18. The converter 18 is electrically connected between the first and second AC input ends AC1, AC2, and has a first DC output end DC1 and a second DC output end DC2, wherein the second DC output end DC2 is connected to the ground. The control unit 12 has two power input ends that are respectively electrically connected to the first DC output end DC1 and the second DC output end DC2 of the converter 18. The converter 18 converts the AC input power into a DC output power, and provides the DC output power to the control unit 12.

In the present embodiment, the main control device 1 further includes a first output end O/P1, a second output end O/P2, a second switch unit Q2, a third switch unit Q3, a fourth switch unit Q4, and a fifth switch unit Q5. Each of the second, third, fourth and fifth switch units Q2, Q3, Q4, Q5 has a first end, a second end, and a control end. The control unit 12 includes a first control output end CTL1 and a second control output end CTL2.

The connection module 15 includes two connecting ends that are electrically connected to the first output end O/P1 and the second output end O/P2 of the main control device 1, wherein the series lights SL are connected in series between the two connecting ends of the connection module 15 when plugged into the output sockets.

The second, third, fourth and fifth switch units Q2, Q3, Q4, Q5 are electrically connected to control the output current which is sent to the connection module 15, and to control the lighting modes of the series lights SL. The connection of the switch units are specified as follows.

Figure 7:
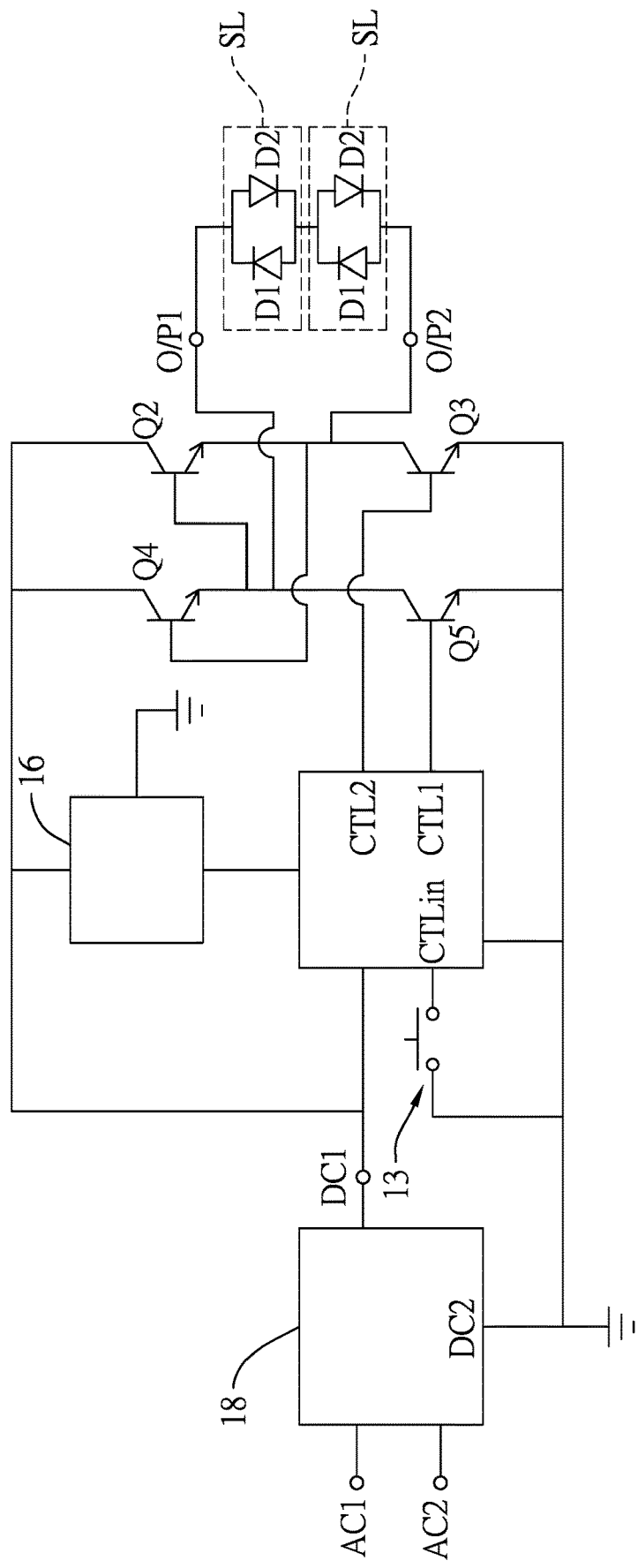
FIG. 7 is a circuit diagram of a fourth embodiment of the multi-mode series light controlling system of the present invention.

With reference to FIG. 7, the first ends of the second switch unit Q2 and the fourth switch unit Q4 are connected to the first DC output end of the converter 18, the second end of the second switch unit Q2 is connected to the first end of the third switch unit Q3, and the second end of the third switch unit Q3 is connected to the ground. Similarly, the first end of the fourth switch unit Q4 is connected to the first DC output end of the converter 18, the second end of the fourth switch unit Q4 is connected to the first end of the fifth switch unit Q5, and the second end of the fifth switch unit Q5 is connected to the ground. The control end of the second switch unit Q2 is connected to the second end of the fourth switch unit Q4, and the control end of the fourth switch unit Q4 is electrically connected to the second end of the second switch unit Q2. The control end of the third switch unit Q3 is connected to the first control output end CTL1 of the control unit 12, and the control end of the fifth switch unit Q5 is connected to the second control output end CTL2 of the control unit 12. Furthermore, the first output end O/P1 is connected to the second end of the second switch unit Q2, and the second output end O/P2 is connected to the second end of the fourth switch unit Q4.

Preferably, the second, third, fourth and fifth switch units Q2, Q3, Q4, Q5 are bipolar junction transistors (BJTs). The first ends of the switch units are the collectors of the switch units, the second ends of the switch units are the emitters of the switch units, and the control ends of the switch units are the bases of the switch units.

When the control unit 12 sends a high voltage signal to the control end of the fifth switch unit Q5 and a low voltage signal to the control end of the third switch unit Q3, the first LED D1 of each series light SL may emit light. When the control unit 12 sends a low voltage signal to the control end of the fifth switch unit and a high voltage signal to the control end of the third switch unit Q3, the second LED D2 of each series light SL may emit light. Therefore, by sending specific signal combinations to the control ends of the third and fifth switch units, the control unit 12 controls the lighting patterns of the series lights SL altogether.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multi-mode series light controlling system, comprising:
   a main control device, including:
      a front plug;
      a mode switching key;
      a control unit, electrically connected to the mode switching key;
      a tail plug, electrically connected to the front plug through the control unit;
      a connection module, electrically connected to the tail plug, and including multiple output sockets; wherein
   the control unit generates a mode switching signal when the mode switching key is triggered, generates a lighting control signal accordingly, and sends the lighting control signal to the output sockets of the connection module.

2. The multi-mode series light controlling system as claimed in claim 1, wherein the main control device further includes a first wireless communication unit electrically connected to the control unit; wherein
   when the control unit receives a wireless control signal through the first wireless communication unit, the control unit generates the lighting control signal accordingly.

3. The multi-mode series light controlling system as claimed in claim 2, wherein the first wireless communication unit is a Bluetooth module.

4. The multi-mode series light controlling system as claimed in claim 2, wherein the first wireless communication unit is a Wi-Fi module.

5. The multi-mode series light controlling system as claimed in claim 2, further comprising:
   a remote controller, including:
      a processor;
      a time setting key, electrically connected to the processor; and
      a second wireless communication unit, electrically connected to the processor; wherein
   the main control device further comprises a timer unit, electrically connected to the control unit, and the timer unit is wirelessly connected to the remote controller through the first wireless communication unit.

6. The multi-mode series light controlling system as claimed in claim 5, wherein the remote controller further includes
   a first function key, electrically connected to the processor; when the first function key is triggered, the processor generates the wireless control signal, and sends the wireless control signal to the first wireless communication unit of the main control device through the second wireless communication unit.

7. The multi-mode series light controlling system as claimed in claim 1, wherein the main control device further comprises:
   a first switch unit, having a control end;
   a first AC input end and a second AC input end, electrically and respectively connected to two pins of the front plug;
   a first output end and a second output end, wherein the first output end is electrically connected to the first AC input end, and the second output end is electrically connected to the second AC input end through the first switch unit; wherein
   the control unit further includes:
      a power input end, electrically connected to the first AC input end;
      a control input end, electrically connected to a ground through the mode switching key;
      a control output end, electrically connected to the control end of the first switch unit.

8. The multi-mode series light controlling system as claimed in claim 1, wherein the main control device further comprises
   a first AC input end and a second AC input end, electrically and respectively connected to two pins of the front plug;
   a first output end and a second output end;
   a converter, electrically connected to the first AC input end and the second AC input end, and having a first DC output end and a second DC output end; wherein
   the control unit further includes two power input ends, and the power input ends are respectively electrically connected to the first DC output end and the second DC output end of the converter.

9. The multi-mode series light controlling system as claimed in claim 8, wherein the main control device further comprises
   a second switch unit, having a first end, a second end, and a control end;
   a third switch unit, having a first end, a second end, and a control end;
   a fourth switch unit, having a first end, a second end, and a control end;
   a fifth switch unit, having a first end, a second end, and a control end; wherein
   the control unit includes a first control output end and a second control output end;
   the first end of the second switch unit is connected to the first DC output end of the converter, the second end of the second switch unit is connected to the first end of the third switch unit, and the second end of the third switch unit is connected to the ground;
   the first end of the fourth switch unit is connected to the first DC output end of the converter, the second end of the fourth switch unit is connected to the first end of the fifth switch unit, and the second end of the fifth switch unit is connected to the ground;
   the control end of the second switch unit is connected to the second end of the fourth switch unit, and the control end of the fourth switch unit is electrically connected to the second end of the second switch unit;
   the control end of the third switch unit is connected to the first control output end of the control unit, and the control end of the fifth switch unit is connected to the second control output end of the control unit;
   the first output end is connected to the second end of the second switch unit, and the second output end is connected to the second end of the fourth switch unit.

\* \* \* \* \*